Nov. 15, 1960         H. E. ROSE         2,960,111

SELECTOR VALVE WITH PRESSURE BALANCED LOAD HOLDING POPPET VALVE

Filed May 27, 1958         2 Sheets-Sheet 1

Inventor:
Howard E. Rose
By: Frank C. Parker Atty

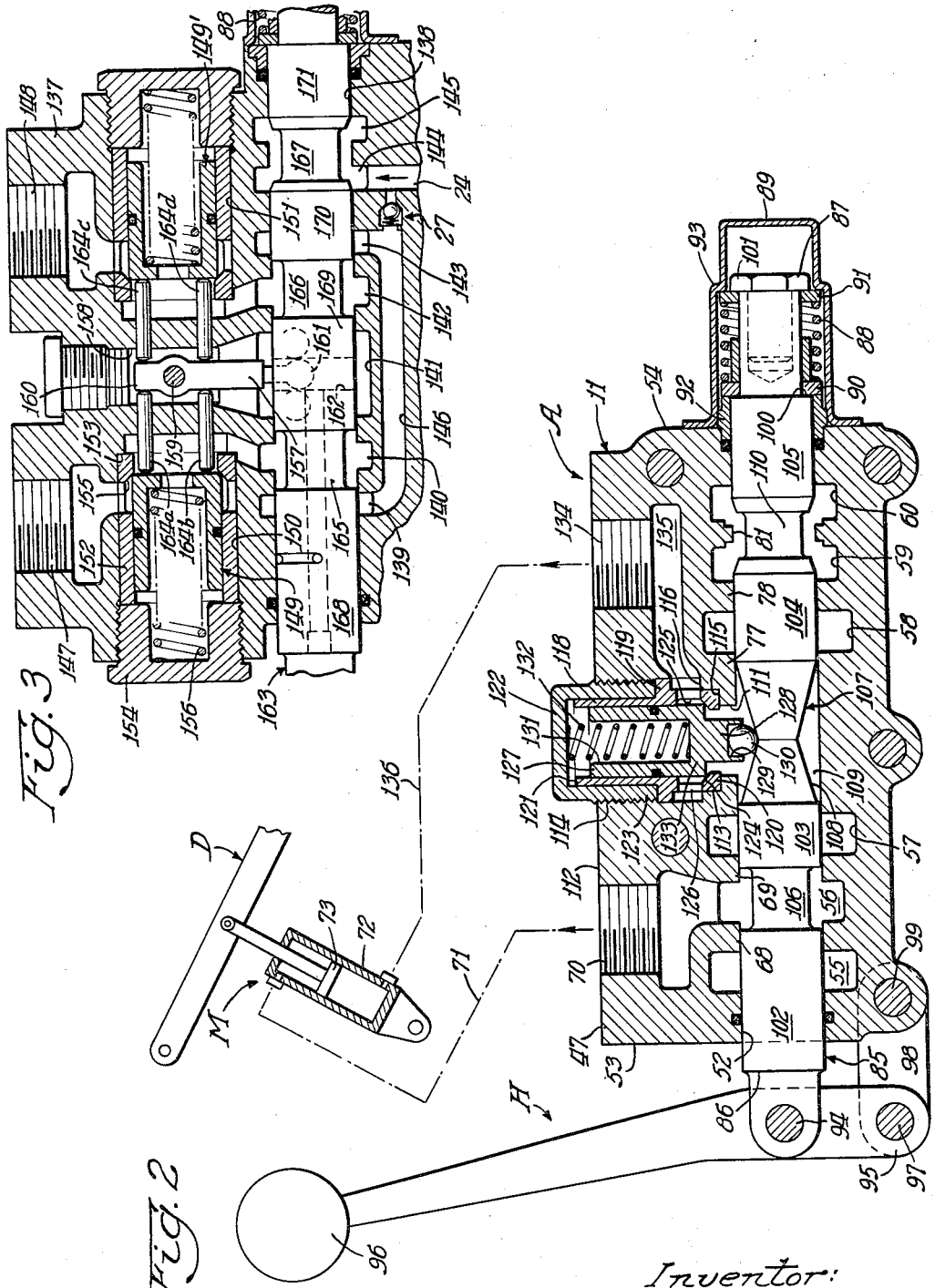

United States Patent Office 2,960,111
Patented Nov. 15, 1960

2,960,111

SELECTOR VALVE WITH PRESSURE BALANCED LOAD HOLDING POPPET VALVE

Howard E. Rose, Hudson, Ohio, assignor to Borg-Warner Corporation, Chicago, Ill., a corporation of Illinois Filed May 27, 1958, Ser. No. 738,214

3 Claims. (Cl. 137—622)

This invention relates to a control valve having a spool valve utilized in combination with a poppet type valve, and, in particular, to a hydraulic flow control valve comprising a plurality of four-way valve sections for selectively controlling fluid flow to and from hydraulic equipment, such as hoisting apparatus, each of the four-way valve sections including a spool valve utilized in combination and in series with at least one poppet type valve to control hydraulic flow, the spool and poppet valves being mechanically interconnected whereby movement of the spool valve actuates the poppet valve.

It is well known in the art to construct a hydraulic flow control valve with a plurality of valve sections stacked and fastened together to form a common housing, each valve section being adapted to be operated independently of the other valve sections and being utilized for controlling the flow of hydraulic fluid to and from a utilization device. Normally, each valve section includes an axially movable four-way metering type spool valve disposed within a bore formed in the valve section and adapted to direct hydraulic fluid, supplied to the valve sections under pressure, to either end of a hydraulic motor such as a hydraulically actuated cylinder and piston type motor assembly. The pressure fluid supplied to the valve section may be selectively directed to one side of the hydraulic motor and the fluid in the other side thereof simultaneously directed to a vent or return means upon manual or automatic axial movement of the spool valve in one direction from a predetermined or neutral position of the spool valve. Axial movement of the spool valve in the other direction, directs pressure fluid to the other side of the motor and simultaneously directs the fluid from the one side of the motor to the vent or return means. In this manner the hydraulic control valve is adapted to control movement of the motor piston in either direction. The spool valve is provided with a null or neutral position whereby the fluid on both sides of the motor is completely trapped thereby maintaining the motor piston in a desired position, and the hydraulic fluid, directed to that particular valve section, is by-passed by a control surface formed on the spool valve to the vent or return means. It is normally desired that the spool valve be so constructed and arranged that metering or throttling of the fluid directed to and from the hydraulic motor may be accurately controlled in order to provide accurate control over the utilization devices connected to the motor piston. However, it has been found that to provide for accurate metering, the spool valve must be adapted to be freely, axially movable within its valve section so as to prevent sticking therein which results in subsequent overhunting and the tendency to cause surges in the hydraulic flow. This metering advantage of the spool type valve, however, has the disadvantage of preventing close tolerances between the spool valve and the internal peripheral surface of the valve section, the internal peripheral surface being defined by the bore formed therein. When these close tolerances are not provided, the valve is subject to hydraulic leakage between the bore and the spool valve when the spool valve is in its predetermined or null position thereby seriously affecting the overall performance of the valve as the motor piston will not remain in a desired position.

In order to overcome the above mentioned disadvantage of a spool type valve, various valve designs have been created whereby a poppet type valve is used in combination and in series with the spool valve, the poppet type valve being utilized to completely seal off certain hydraulic passages interconnected with the motor when the spool valve is in its null or centered position to thereby prevent leakage by means of the poppet valve. When it is desired to direct hydraulic flow by movement of the spool valve, the poppet valve is actuated to its open position to permit the passage of fluid through its respective passage. In these prior known designs the force of the fluid is utilized to open the poppet valve whereby the poppet valve effects throttling of the flow of fluid therethrough and thus minimizes the advantage of having a metering type spool valve.

Therefore, one of the objects of this invention is to provide an improved valve assembly having a metering type spool valve utilized in combination and in series with a positive type poppet valve in order to combine the advantages of a metering valve together with a valve that has the advantages of positively preventing leakages and which has no effect on the metering function of the spool valve.

It is another object of this invention to provide a valve having an axially movable spool type valve utilized in combination and in series with a poppet type valve whereby axial movement of the spool valve from its neutral or centered position actuates the poppet valve to its opened position.

A further object of this invention is to provide an improved hydraulic control valve having an axially movable metering type spool valve utilized in combination and in series with a hydraulically balanced, positive type poppet valve, the spool valve being operatively interconnected with the poppet valve whereby axial movement of the spool valve from its neutral or centered position causes the poppet valve to be mechanically actuated to its opened position.

Another object of this invention is to provide a hydraulic valve comprising a housing having spaced ports formed therein interconnecting a longitudinal bore formed in the housing, an axial movable metering type spool valve disposed in the bore, the spool valve being adapted when in its null or centered position to prevent communication between certain of the ports and when axially moved from its null position to selectively interconnect certain combinations of the ports, and at least one hydraulically balanced poppet valve disposed in one of the ports and being mechanically interconnected with the spool valve whereby the poppet valve is actuated to its opened position to permit hydraulic flow through its respective port upon axial movement of the spool valve from its null position.

Another object of this invention is to provide a hydraulic valve in accordance with the preceding object where the spool valve is provided with a control surface that is adapted to fully interconnect a source of fluid pressure, delivered to the hydraulic valve by an inlet means formed therein, to a sump when the spool valve is in its null position, and to infinitely and progressively close the connection between the source and the sump upon axial movement of the spool valve from its null position in order to direct the fluid delivered to the valve to various selected ports.

A further object of this invention is to provide a hydraulic valve formed in accordance with the preceding object in combination with a one-way valve disposed in the inlet means, the one-way valve being adapted to normally prevent communication between the inlet and the spool valve bore when the spool valve is in its null position, and to permit communication when the spool valve is axially moved from its null position in either direction whereby the connection between the inlet means and the sump is closed and thus permits the force of the hydraulic fluid to overcome the one-way valve means and flow to the spool valve bore where the spool valve directs the same to various selected ports.

A further object of this invention is to provide a valve having a housing provided with a plurality of spaced ports and a transverse bore formed therein inter-connecting the ports; a spool valve disposed within the bore and being so constructed and arranged that when the spool valve is in its null or neutral position it prevents communication between certain of the ports and is adapted to permit selected communication between certain of the ports when axially moved from its null position; a poppet valve disposed in one of the ports and being mechanically interconnected with the spool valve whereby the poppet valve prevents communication through its respective port when the spool valve is in its null position and permits such communication when the spool valve is axially moved from its null position, the sequence of operation being that the poppet valve permits communication through its respective port prior to when the spool valve permits communication through that port upon the axial movement thereof from its null position.

Other and more particular objects, advantages and uses of this invention will become apparent from a reading of the following specification taken in connection with the accompanying drawings which form a part thereof and wherein:

Figure 2 illustrates, in axial cross section, the valve illustrated in Figure 1, taken on lines 2—2 thereof.

Figure 3 illustrates, in axial cross section, another form of a valve constructed in accordance with this invention.

Figure 1:
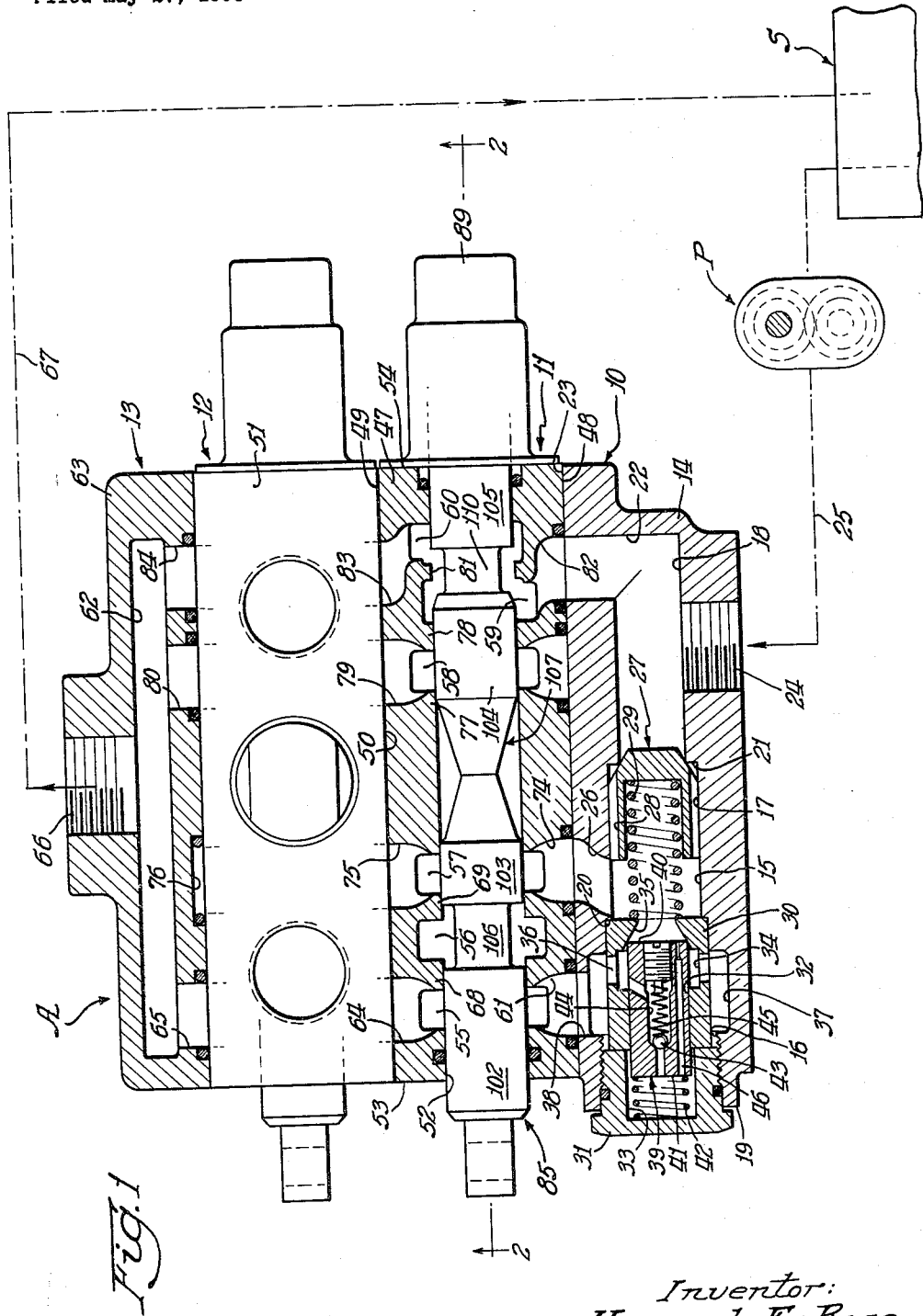
Figure 1 illustrates, in a partially broken away view, a stacked valve formed in accordance with the teachings of this invention.

Reference is now made to the drawings wherein like reference numerals are used throughout the various figures thereof to designate like parts where appropriate, and, in particular, reference is made to Figure 1 where the reference letter A designates, generally, a stacked valve formed in accordance with this invention.

The stacked valve A comprises a plurality of valve sections 10, 11, 12 and 13 suitably fastened together. The valve section 10 comprises a housing 14 having an elongated bore 15 formed therein, the bore 15 being formed of three concentrically disposed, interconnected bore sections 16, 17 and 18. The bore section 16 interrupts an end 19 of the housing 14 and forms a shoulder 20 at its juncture with the bore section 17, and the bore section 17 forms a shoulder or valve seat 21 at its juncture with the bore section 18. The bore section 18 is, in turn, inter-connected at one end thereof with a perpendicularly disposed passage or bore means 22. The passage 22 interrupts a substantially flat end surface 23 of the housing 14. An inlet 24 interconnects the bore section 18 of the bore 15 with the discharge side of a hydraulic pump P by suitable conduit means 25 whereby hydraulic fluid from a source or sump S is adapted to be delivered by the pump P to the inlet 24 of the valve A.

A passage 26 is formed in the housing 14 and interconnects the end surface 23 thereof with the bore section 17 of the bore 15 at a point spaced from the valve seat 21. A one-way valve 27 is disposed within the section 17 of the bore 15 and is adapted to suitably engage the valve seat 21 in order to prevent communication between the bore sections 17 and 18. The valve 27 is formed with a plurality of longitudinally disposed slots 28 in the outer periphery thereof which are adapted to interconnect the bore sections 17 and 18 when the valve 27 is axially moved away from its valve seat 21 to the left, as viewed in the drawings. The valve 27 is urged into its sealing position against the valve seat 21 by the force of a spring 29 disposed between the valve 27 and a stationary sleeve member 30 disposed within the bore section 16. The sleeve member 30 is held in engagement against the shoulder 20 by a plug member 31 threadably disposed within the left end of the bore section 16.

The sleeve member 30 is provided with a centrally disposed bore 32 formed at the left end thereof, the bore 32 communicating at one end thereof with an open ended bore 33 formed in the plug member 31. The bore 32 is interconnected at the other end thereof with an annular groove 34 formed in the sleeve member 30, the annular groove 34 formed in the sleeve member 30, the annular groove 34 interconnecting with a frusto-conically shaped bore 35 formed in the right end of the sleeve member 30. A plurality of radially disposed ports 36, formed in the sleeve member 30, interconnect the annular groove 34 thereof with an annular groove 37 formed in the housing 14 of the valve section 10. The annular groove 37 is, in turn, interconnected with the flat surface 23 of the housing 14 by an interconnecting passage 38 formed in the housing 14.

A substantially cylindrical valve member 39, having opposed ends 40 and 41, is disposed within the bore 32 of the sleeve member 30 and is adapted to be axially movable therein. A spring 42 is disposed within the bore 33 of the plug member 31 and is adapted to have one end thereof engage the stationary plug member 31 and the other end thereof engage the end 41 of the valve member 39. The compression force of the spring 42 tends to maintain the end 40 of the valve member 39 in sealing engagement with the tapered bore or valve seat 35 of the sleeve member 30 to thereby prevent communication between the bore section 17 and the passage 38 formed in the housing 14.

A spring biased ball check valve 43 is disposed within a passage means 44 formed within the valve member 39, the passage means 44 being interconnected with the bore 33 at one end thereof and with the passage 38 of the housing 14 at the other end thereof. The ball check valve 43 is normally biased to its closed position by a spring 45 to prevent communication through the passage means 44. The valve member 39 is provided with a restricted passage 46 interconnecting the bore section 17 with the bore 33 formed in the plug member 31. The valve member 39 is, therefore, hydraulically balanced by means of the restricted passage 46 and is thereby urged to its sealing position against the valve seat 35 solely by the force of the compression spring 42. The operation of the valve member 39 will now be described.

Assuming that hydraulic fluid delivered by the pump P is permitted to enter the bore section 17 by passing through the valve 27, it can be seen that the force of the pressure fluid within the bore section 17 acts against the end 40 of the normally closed valve member 39 as well as against the other end 41 thereof whereby only the force of the spring 42 maintains the valve member 39 in its closed position. When the force of the pressure fluid within the bore section 17 and bore 33 exceeds a predetermined value, the force of the pressure fluid acting against the ball check valve 43 overcomes the force of the biasing means 45 and permits the hydraulic fluid within the bore 33 to bleed out through the passage means 44 to the passage 38 thus hydraulically unbalancing the valve member 39. The escape of hydraulic fluid from the bore 33 permits the force of the pressure fluid acting on the end 40 of the valve member 39 to be opposed only by the relatively weak compression force of the spring 42 and thereby axially moves the valve member 39 away from its valve seat 35. Movement of the valve member 39 permits the hydraulic fluid within the bore section 17 to flow to the passage 38. The valve member 39 is no longer hydraulically balanced when the ball check valve 43 is opened, because the restricted passage 46 does not permit the bore 33 to fill with hydraulic fluid from the bore section 17 as fast as the ball check valve 43 permits the venting of the hydraulic fluid from the bore 33.

Therefore, it can be seen that the valve member 39 maintains the pressure value of the hydraulic fluid delivered to the valve A below a predetermined value, the predetermined value being controlled by the force of the spring 45 tending to maintain the ball valve 43 in its closed position. The force of the spring 45 may be changed by any suitable adjusting means.

The valve sections 11 and 12 of the valve A are substantially the same and, therefore, only the valve section 11 will be described. The valve section 11 comprises a housing 47 having substantially flat parallel opposed end surfaces 48 and 49. The end surface 48 of the housing 47 is adapted to be fastened by suitable means in sealing engagement with the flat surface 23 of the housing 14. Similarly, the flat end surface 49 of the housing 47 is fastened in sealing engagement with a flat end surface 50 of the housing 51 of the valve section 12.

A longitudinal bore 52 is formed in the housing 47, the bore 52 interrupting opposed ends 53 and 54 of the housing 47. The housing 47 is provided with a plurality of spaced annular grooves 55, 56, 57, 58, 59 and 60, each being interconnected with the longitudinal bore 52. The annular groove 55 is interconnected with the passage 38 formed in the housing 14 by an interconnecting passage 61 formed in the housing 47. The annular groove 55 is also interconnected with a manifold chamber 62 formed in the housing 63 of the valve section 13 by a passage 64 formed in the housing 47 which communicates, through similar passages and an annular groove formed in the valve section 12, with a passage 65 formed in the housing 63 of the valve section 13. The manifold chamber 62 is interconnected with an outlet port 66 formed in the housing 63, which is, in turn, interconnected by suitable conduit means 67 with the source or sump S.

The annular groove 56, being separated from the adjacent annular grooves 55 and 57 by respective bore land portions 68 and 69, is interconnected with a transverse outlet port 70 (see Figure 2) formed in the valve housing 47. The outlet port 70 is suitably interconnected by conduit means 71 with the "lowering" side of the hydraulic motor M (See Figure 2). The motor M comprises a cylinder block 72 having a piston 73 disposed therein and being operatively interconnected with a utilization device D.

The annular groove 57 is interconnected with the passage 26 of the valve section 10 by an interconnecting passage 74 formed in the housing 47. The annular groove 57 is, in turn, interconnected by a passage 75 formed in the housing 47, through similar passages and an annular groove formed in the valve section 12, with a closed chamber 76 formed in the housing 63 of valve section 13. It can be seen that the annular groove 57 is adapted to be interconnected with the inlet port 24 of the valve A when the valve 27 is in its opened position.

The annular groove 58 is spaced from the adjacent annular grooves 57 and 59 by respective bore land portions 77 and 78. The annular groove 58 is interconnected by a passage 79 formed in the housing 47, through similar passages and an annular groove formed in the valve section 12, with a passage 80 formed in the housing 63 of the valve section 13. The passage 80 is, in turn, interconnected with the manifold chamber 62.

The annular groove 59, being spaced by a bore land portion 81 from the adjacent annular groove 60, is interconnected with the passage 22 of the housing 14 by a passage 82 formed in the housing 47. It can be seen that the annular groove 59 is adapted to be in communication with the inlet port 24.

The annular groove 60 is interconnected by a passage 83 formed in the housing 47, through similar passages and an annular groove in the valve section 12, with a passage 84 formed in the housing 63 of the valve section 13. The passage 84 is, in turn, interconnected with the manifold chamber 62.

A spool valve 85, having opposed ends 86 and 87, is disposed within the valve bore 52 and is adapted for axial movement therein. The spool valve 85 is adapted to be disposed in a predetermined position relative to the housing 47 by means of a spring 88 disposed within a cup shaped member 89 suitably fastened to the end 57 of the housing 47. The helical spring 88 is adapted to be disposed about the right end of the spool valve 85 and has one end thereof engaging an annular ring or collar 90 disposed about the spool valve 85 and has the other end thereof engaging another ring or collar 91 disposed about the spool valve 85, the rings 90 and 91 being maintained in spaced relation relative to each other by the spring 88, but being adapted to be axially moved toward each other. The ring 90 is prevented from moving to the left, from the position illustrated in Figure 2, by a sleeve 92 fixed between the housing 47 and the cup member 89. Similarly, the ring 91 is prevented from being moved to the right, from the position shown in Figure 2, by a flange portion 93 formed on the cup member 89.

A control handle H is pivotally connected to the end 86 of the spool valve 85 by a pivot pin 94, the pin 94 being located at a point intermediate the ends 95 and 96 of the handle H. The end 95 of the handle H is connected to one end of a toggle member 98 by a pivot pin 97, and the toggle member 98 is pivotally attached to the housing 47 by a pivot pin 99 at the other end thereof. The toggle member 98 permits the spool valve 85 to be axially moved in either direction from its predetermined or neutral position upon corresponding movement of the grasping end 96 of the handle H. The spring 88 tends to maintain the spool valve 85, and, subsequently, the handle H in a predetermined position relative to the housing 47.

As shown in Figure 2 of the drawings, movement of the grasping end 96 of the handle H to the right from the neutral position causes axial movement of the valve 85 to the right thereby compressing the spring 88 as the ring 90 is correspondingly moved to the right toward the ring 91. The ring 90 is carried to the right by a shoulder 100 formed on the valve spool 85. Upon release of the handle H from its position to the right, the spring 88 will return the spool valve 85 to its predetermined position relative to the housing 47, the predetermined position being attained when the ring 90 is in engagement with the sleeve 92. Movement of the grasping end 96 of the handle H to the left from the neutral position will cause axial movement of the spool valve 85 to the left and corresponding movement of the ring 91 toward the now stationary ring 90 compressing the spring 88 therebetween. The ring 91 is carried to the left by a radially outwardly projecting flange portion 101 formed on the spool valve 85. Upon release of the handle H from the left position thereof, the spring 88 will return the valve spool 85 to its predetermined position relative to the housing 47 where the ring 91 abuts the flange 93 of the cup member 89 and prevents further movement of the spool valve 85 by the spring 88.

As shown in Figures 1 and 2, the spool valve 85 is formed with spaced lands 102, 103, 104, and 105, which lands are adapted to be in substantially sealing engagement with the internal surface of the housing 14, the internal surface being defined by the bore 52. The lands 102 and 103 are spaced by a reduced portion 106 of the spool valve 85. The reduced portion 106 is so constructed and arranged that, when the spool valve 85 is in its predetermined position (as shown in Figures 1 and 2), the land 102 prevents communication between the annular grooves 55 and 56, and the land 103 prevents communication between the annular grooves 56 and 57. The lands 103 and 104 are spaced from each other by a reduced portion 107 of the spool valve 85, the reduced portion 107 defining a substantially hourglass shaped cam surface 108. It can be seen that when the spool valve 85 is in its null or predetermined position, the cam surface 108 together with the land portion 77 of the housing bore 52 defines a cavity 109. The cavity 109 is prevented from communicating with either of the annular grooves 57 and 58 by respective land portions 103 and 104 of the valve 85. The land 104 of the valve 85 is also adapted to prevent communication between the annular grooves 58 and 59 when the valve 85 is in its predetermined position.

The lands 104 and 105 are spaced by a reduced valve portion 110, the reduced portion 110 being adapted to span the annular grooves 59 and 60 when valve 85 is in its null or predetermined position whereby communcation is permitted between the annular grooves 59 and 60.

The valve housing 47 is provided with a transverse bore 111 interconnecting a top surface 112 of the housing 47 with the bore 52, the bore 111 interrupting the land portion 77. The housing 47 is counterbored with concentric bores 113 and 114 in such a manner that the more 113 forms a shoulder 115 at the juncture of one end thereof with the bore 111, and the bore 114 forms a shoulder 116 at its juncture with the other end of bore 113. A hollow cylindrical sleeve member 118 is disposed within the bore 113 and is provided with a radially outwardly extending flange 119 adapted to be telescopically received in the bore 114, the flange 119 being disposed between ends 120 and 121 of the sleeve member 118. The end 120 of the sleeve member 118 is held into sealing engagement with the shoulder 115 of the housing 47 by an end cap 122 threadedly received in the bore 114 and having one end 123 thereof engaging the flange 119 of the sleeve member 118. The sleeve member 118 is provided with a bevelled or frustoconically shaped valve seat 124 adjacent the end 120 thereof. The valve member 118 is provided with an annular groove 125 intermediate the valve seat 124 and the flange 119 thereof. A plurality of ports 126 interconnect the annular groove 125 with the portion of the bore 114 disposed between the shoulder 116 and the flange 119 of the sleeve member 118.

A poppet type valve 127 is sealably disposed within the sleeve member 118 and is adapted to be axially movable relative thereto. The poppet valve 127 is provided with a centrally disposed projection 128 having an open ended bore 129 formed therein. A ball bearing 130 is disposed within the open ended bore 129 and is carried thereby in such a manner that a portion of the outer surface thereof projects beyond the projection 128 and is adapted to engage the hourglass shaped surface 108 of the spool valve 85.

The poppet valve 127 is provided with another open ended bore 131 at the other end thereof. A spring 132 is disposed within the bore 131 of the valve 127 and has one end thereof engaging the poppet valve 127 and the other end thereof engaging the cup number 122. The compression force of the spring 132 tends to maintain the poppet valve into sealing engagement with its valve seat 124 when the spool valve 85 it in its predetermined position thereby preventing communication between the cavity 109 and the ports 126. A passage 133 is formed in the poppet valve 127 and is so located that it permits communication between the cavity 109 and the bore 131 at all times to thereby hydraulically balance the poppet valve 127.

An outlet port 134 formed in the housing 47 is adapted to be interconnected with the ports 126 by an interconnecting passage 135 formed in the housing 47. The outlet port 134 is, in turn, interconnected by suitable conduit means 136 with the "raise" side of the motor M.

It is to be understood that the valve section 12 is formed in a similar manner to the valve section 11 and is adapted to contain a similarly constructed spool valve and poppet valve. It should further be understood that a stacked valve A may be formed having more than two such valve sections or any combination of different types of valve sections and that the valve A may also be formed with an integral housing, suitably bored in a manner will known in the art, rather than being constructed of a plurality of stacked sections as previously described. The feature being deemed essential to this invention is to provide a valve having a spool valve utilized in combination and in series with a poppet type valve.

The operation of the valve A, illustrated in Figures 1 and 2, will now be described. Since both valve sections 11 and 12 function in the same manner, it is only necessary to described the operation of the valve section 11. Assuming that the spool valve 85 is in its neutral or predetermined position and that the pump P is operating, the pump P receives hydraulic fluid from the source S and discharges the same through the conduit means 25 into the inlet 24 of the valve A. Since the spool valve 85 is in its null or predetermined position, the reduced portion 110 of the spool valve 85 permits communication between the annular grooves 59 and 60 whereby the hydraulic fluid entering the valve A is bypassed, through the bore section 18, passages 22 and 82, annular grooves 59 and 60, passages 83 and 84, manifold chamber 62, outlet port 66, and conduit means 67, to the source or sump S. Since the hydraulic fluid is thus bypassed, the force thereof acting against the valve 27 is insufficient to cause the opening thereof against the force of the spring 29. When the valve 85 is in this predetermined position, the poppet valve 127 is permitted to positively seal off communication between the "raise" side of the motor M and the cavity 109 of the valve section 11. Therefore, the utilization device D, such as a lift member of a hoisting apparatus, is positively maintained in the position shown in Figure 2 and the weight thereof tending to force the piston 73 downwardly is completely resisted by the trapped hydraulic fluid between the motor M and the poppet valve 127.

When it is desired to raise the lift device D, the grasping end of the handle H is moved to the left, as viewed in the drawings, which causes axial movement of the spool valve 85 to the left. Because of the particular shape of the hourglass cam surface 108, the ball bearing 130 engaged thereby is caused to be cammed upwardly carrying with it the poppet valve 127 in opposition to the force of the spring 132 thus opening the communication between the "raise" side of the motor M and the cavity 109. Further movement of the spool valve 85 to the left, permits the annular groove 57 to be interconnected with the cavity 109 by means of the reduced portion 107 of the spool valve 85. Since the poppet valve 127 has been previously opened, this subsequent interconnection between the cavity 109 and the annular groove 57 permits a portion of hydraulic fluid from the raise side of the hydraulic motor M to pass into the bore section 17 by means of the interconnected passages 74 and 26. The normally closed poppet valve 27 prevents further escape of this hydraulic fluid. The next step in the sequence of operation, after the annular groove 57 is interconnected with the cavity 109, is that, upon further axial movement of the spool valve 85 to the left, the "lowering" side of the motor M is interconnected to the annular groove 55 by the reduced portion 106 of the spool valve 85 spanning the annular grooves 55 and 56. By thus interconnecting the lower side of the motor M to the annular groove 55, the hydraulic fluid in the "lowering" side of the motor M is adapted to be interconnected with the sump S through passages 64 and 65, exhaust manifold 62, outlet port 66, and conduit means 67. Further movement to the left of the valve 85 causes the land portion 105 thereof to be telescopically received within the land portion 81 of the housing bore 52 and thus progressively and infinitely closes off the connection between the annular grooves 59 and 60. This permits the hydraulic fluid, delivered by the pump P to the bore section 18, to act against the one-way valve 27. When the force of this pressure fluid exceeds the compression force of the spring 29 acting in opposition thereof, the valve 27 is moved to the left permitting the hydraulic fluid delivered by the pump P to pass through the bore section 17, passages 26 and 74, and into the annular groove 57. The hydraulic fluid flows from the annular groove 57 into the cavity 109, through the open poppet valve 127, outlet 134, and conduit means 136, to the "raise" side of the motor M thereby effecting upward movement of the piston 73. This upward movement of the piston 73, of course, causes the expulsion of hydraulic fluid from the "lowering" side thereof through the open communication between the outlet 70 and the sump S previously described. It is to be understood that the valve member 39 maintains the pressure value of the hydraulic fluid passing through the opened valve 27 below a predetermined value.

Therefore, it can be seen that the sequence of operation for raising the hoist arm D by axial movement of the spool valve 85 to the left from its neutral position provides the following steps, in the order listed.

(1) The poppet valve 127 is opened.
(2) The annular groove 57 is interconnected with the cavity 109 and thereby interconnected with the "raise" side of the motor M.
(3) The "lowering" side of the motor M is interconnected with the sump S by the valve portion 106 spanning the annular grooves 55 and 56.
(4) Communication between the annular grooves 59 and 60 is infinitely and progressively closed by the land 105 of the spool valve 85 thereby permitting the force of the hydraulic fluid to act against the valve 27.
(5) The valve 27 is opened, thus interconnecting the discharge of the pump P with the "raise" side of the motor M causing the piston 73 thereof to be moved upwardly by the hydraulic fluid.

After the piston 73 has been moved the desired distance, the handle H is returned to its neutral position by the spring 88 thereby closing the poppet valve 127 and positively trapping the fluid within the "raise" side of the motor M.

When it is desired to lower the device D, the spool valve 85 is axially moved to the right. Upon movement of the spool valve 85 to the right, the following sequence of operation is effected in the order stated: the poppet valve 127 is actuated to its open position by the cam surface 108; the "lowering" side of the motor M is interconnected to the annular groove 57 by the reduced portion 106 of the valve 85; and the cavity 109 is interconnected with the annular groove 58 by the reduced portion 107 of the valve 85 whereby the "raise" side of the motor M is interconnected with the sump S. As can be seen, if there is nothing obstructing the lowering of the device D, the weight thereof will cause the hydraulic fluid within the "raise" side of the motor M to flow to the sump S. However, assuming that it is necessary to use hydraulic power to lower the device D, further movement of the valve 85 to the right causes progressively and infinitely closing of the connection between the annular grooves 59 and 60 by the land 104 of the spool valve 85. The hydraulic fluid discharged by the pump P is now permitted to open the valve 27 and is thus interconnected with the annular groove 57, the annular groove 57 being interconnected with the "lowering" side of the motor M by the reduced portion 106 of the valve 85 whereby the fluid pressure enters the "lowering" side of the motor M and effects downward movement of the piston 73. When the piston 73 has reached the desired position, the handle H is released and is returned to the neutral position by the spring 88 in the manner previously described.

It can be seen that by thus permitting the poppet valve 127 to be opened before any hydraulic fluid is directed by the spool valve 85 to either the "raise" or "lowering" side of the motor M, the poppet valve 127 does not have any throttling effect on the hydraulic fluid and thereby all throttling of the hydraulic fluid is provided only by the spool valve 85.

It may be desired to provide a valve section similar to valve sections 11 and 12 which would include a poppet type valve in each of the ports connected to the motor M instead of just one, as is shown in Figures 1 and 2. One application requiring a poppet valve in each of the valve outlets is where the utilization device requires hydraulic pressure to be supplied to either side of the motor M in order to move the piston disposed therein, and it is necessary to prevent movement of the piston in either direction when the spool valve is in the neutral position. Such a valve arrangement is shown in Figure 3 and will now be described.

As shown in Figure 3, only one section of a stacked valve arrangement is shown in axial cross section and comprises a housing 137 having a longitudinal bore 138 passing therethrough. A plurality of spaced annular grooves 139, 140, 141, 142, 143, 144 and 145 are formed in the housing 137 and are each interconnected with the bore 138.

The annular grooves 139 and 143 are interconnected by a passage 146 formed in the housing 137 which is, in turn, interconnected through the one way check valve 27 with the inlet port 24. The annualr groove 144 is also interconnected with the inlet port 24. The annular grooves 141 and 145 are adapted to be interconnected to the sump S in a manner similar to the annular grooves 55, 58 and 60 illustrated in the Figure 1 embodiment.

The annular grooves 140 and 143 are respectively interconnected to the spaced cylinder outlet ports 147 and 148 formed in the housing 137. The outlet ports 147 and 148 are adapted to be respectively connected to each side of a hydraulic motor (not shown), such as the motor M illustrated in Figure 2.

Positive type hydraulically balanced poppet valves 149 and 149$^1$, each being similar to the poppet valve 127, are respectively disposed within opposed, open ended bores 150 and 151 formed in the housing 137. Since each poppet valve 149 and 149$^1$ is formed identical to the other, only the poppet valve 149 disposed in the bore 150 will be described. The poppet valve 149 is disposed for axial movement within a hollow cylindrical member 152 disposed within the bore 150 and held stationary therein, in engagement with a shoulder 153 formed in the housing 137, by a plug number 154 threadedly disposed within the open end of the bore 150. The poppet valve 149 is spring biased to its closed position, in engagement with a frusto-conically shaped valve seat 155 formed in the member 150, by a spring 156 having one end thereof engaging the poppet valve 149 and the other end thereof engaging the plug member 154. The poppet valves 149 and 149$^1$, when in their closed positions, respectively prevent communication between the annular grooves 140 and 142 and the respective outlet ports 147 and 148.

An arm 157 is pivotally mounted, within a bore 158 formed in the housing 137, by a pivot pin 159 disposed intermediate the ends 160 and 161 of the arm 157. The end 161 of the arm 157 is formed in a substantially rounded configuration adapted to be received within a socket 162 formed in a spool valve 163, the spool valve 163 being adapted to be disposed within the housing bore 139 and operated in a similar manner to the previously described spool valve 85. Pins 164a, 164b, 164c and 164d are adapted to be carried by the housing 137 and be axially movable relative thereto. The spaced parallel pins 164a and 164b are each adapted to engage the left poppet valve 149 at one end thereof and the arm 157 at the other end thereof. In a like manner, the other pair of spaced parallel pins 164c and 164d are each adapted to have one end thereof engage the right poppet valve 149¹ and have the other end thereof engage the arm 157. The arm 157 and pins 164a, b, c, d are so constructed and arranged that when the spool valve 163 is in its null or predetermined position, maintained thereby by the spring means 88 previously described, the poppet valves 149 and 149¹ are in their closed position preventing communication from the annular grooves 140 and 143 to the respective outlet ports 147 and 148.

The spool valve 163 is formed with a plurality of reduced portions 165, 166 and 167 respectively separating spool valve land portions 168, 169, 170 and 171. When the spool valve 163 is in its neutral or predetermined position, the land portions 168 and 170 thereof prevent communication between the annular grooves 139 and 143 and their respective adjacent annular grooves 140 and 142, and the reduced portion 167 permits the hydraulic fluid entering the inlet 24 to be bypassed through the annular grooves 144 and 145 back to the sump S.

The operation of the control valve illustrated in Figure 3 will now be described.

Upon axial movement of the spool valve 163 to the left, as viewed in the drawings, from its null or neutral position by any suitable means such as the handle H, the arm 157, operatively interconnected with the spool valve 163, is caused to rotate clockwise about its pivot pin 159 causing the upper pin 164c at the right thereof to axially move the right poppet valve 149¹ away from its valve seat and simultaneously causing the lower pin 164b at the left thereof to axially move the left poppet valve 149 away from its valve seat whereby both valves 149 and 149¹ are moved to their respective opened positions.

The sequence of operation of the valve illustrated in the Figure 3 embodiment is substantially the same as that previously described for the Figures 1 and 2 embodiment. Upon further axial movement of the spool valve 163 to the left, the reduced portion 165 of the spool valve 163 spans the annular grooves 139 and 140 permitting the hydraulic fluid contained at the side of the motor connected with the outlet port 147 to flow into passage 146. The hydraulic fluid now present in passage 146 is prevented from escaping therefrom by the one-way valve 27. Gradually the reduced portion 166 of the spool valve 163 spans the annular grooves 142 and 141 interconnecting the hydraulic fluid contained at the other side of the motor with the return or sump. Further axial movement of the valve 163 to the left permits the land 171 of the spool valve 163 to progressively and infinitely close the connection between the annular grooves 144 and 145 to thereby cause the pressure fluid delivered to the inlet 24 to open the one-way valve 27 and flow through the passage 146, annular grooves 139 and 140, the open poppet valve 149, and the outlet port 147 to the side of the motor respectively connected thereto. It is also to be understood that the fluid at the other side of the motor is vented to the sump by flowing through the outlet port 148, the opened poppet valve 149¹, annular groove 142, the reduced valve portion 166, and the return outlet annular groove 141.

When it is desired to direct hydraulic fluid to the side of the motor connected with the outlet port 148, the spool valve 163 is axially moved to the right from its neutral or predetermined position. Movement of the spool valve 163 to the right causes the arm 157 to rotate counterclockwise about its pivot pin 159 whereby the end 160 thereof causes the upper right pin 164c to move to the right and open the right poppet valve 149¹ and simultaneously the other end of the arm 157 causes the lower left pin 164b to move to the left and thus open the left poppet valve 149. The remaining sequence of operation is similar to that when the valve 163 is moved to the left except that the hydraulic pressure is delivered from the annular groove 143 to the outlet port 148 and the hydraulic fluid is vented from the outlet port 147 to the sump.

It should be noted that since the poppet valves 127, 149 and 149¹, illustrated respectively in Figures 2 and 3, are hydraulically balanced, the only force necessary to open the same is a force slightly greater than the respective springs 132 and 156 tending to maintain the valves 127, 149 and 149¹ in the closed position. Further, since the poppet valves 127, 149 and 149¹ are mechanically interconnected with the respective spool valves 85 and 163, a high mechanical advantage is created through movement of the handles H whereby little effort is exerted in order to open the poppet valves 127, 149 and 149¹. In this manner, axial movement of the spool valves 85 and 163 may be accurately controlled to thereby maintain the advantage of the metering effect thereof.

It can be seen that there has been described various forms of a four-way control valve utilizing a metering-type spool valve in combination and in series with a positive-type poppet valve, where the poppet valve is mechanically interconnected with the spool valve so that upon movement of the spool valve the poppet valve is actuated. It has also been shown that a plurality of poppet valves may be mechanically interconnected with the spool valve and be operated in substantially the same manner.

While reference has been made to various parts moving to the left or to the right, or raising or lowering, and being located at the right or left, or in upper or lower positions, it is to be understood that this was merely to describe the embodiments shown in the drawings and is not to be considered as limitations to this invention.

Also, while this invention has been disclosed in connection with certain specific embodiments thereof, it is to be understood that these are by way of example rather than limitation, and it is intended that the invention be defined by the appended claims.

What is claimed is:

1. A selector valve comprising a housing having first bore means formed therein, means defining an inlet, and means defining an outlet, said inlet and outlet respectively interconnecting said first bore means with the exterior of said housing, an axially movable spool valve disposed in said bore means, said spool valve being adapted to prevent communication between said inlet and outlet when said spool valve is in a predetermined position relative to said housing and to permit said communication when said spool valve is moved axially from said predetermined position, a second bore in communication with said outlet means, a poppet valve disposed in said second bore, said poppet valve including means defining an open ended bore, a spring disposed in said bore and urging said poppet valve into its closed position, mechanical means operatively connecting said slide valve with said poppet valve for opening said valve, means defining a passage in said poppet valve communicating with said bore and said outlet means whereby when said spool valve is moved axially in one direction from said predetermined position to actuate said poppet valve, communication is provided between said outlet and said bore so that said poppet valve is hydraulically balanced and said poppet valve is actuated solely by said mechanical connection.

2. A selector valve according to claim 1 wherein said mechanical means comprises a cam surface on said spool valve and a projection on said poppet valve in contact therewith.

3. A selector valve according to claim 1 wherein said mechanical means comprises a pivoted arm attached to and actuated by said spool valve, and at least one pin operatively connecting said arm with said poppet valve.

References Cited in the file of this patent

UNITED STATES PATENTS

| 2,363,235 | Ellinwood | Nov. 21, 1944 |
| 2,392,422 | Stephens | Jan. 8, 1946 |
| 2,572,705 | Edman | Oct. 23, 1951 |
| 2,579,137 | Worthington | Dec. 18, 1951 |
| 2,671,433 | Meddock | Mar. 9, 1954 |